(12) United States Patent
Ikeda et al.

(10) Patent No.: US 7,480,073 B2
(45) Date of Patent: Jan. 20, 2009

(54) IMAGE PROCESSING APPARATUS, METHOD AND PROGRAM

(75) Inventors: Hiromi Ikeda, Kanagawa (JP); Toshiaki Fukada, Kanagawa (JP); Makoto Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1033 days.

(21) Appl. No.: 10/705,859

(22) Filed: Nov. 13, 2003

(65) Prior Publication Data

US 2006/0209319 A1 Sep. 21, 2006

(30) Foreign Application Priority Data

Nov. 25, 2002 (JP) .............................. 2002-341259

(51) Int. Cl.
*H04N 1/40* (2006.01)
(52) U.S. Cl. ...................................... 358/1.9; 358/3.28
(58) Field of Classification Search .................. 358/1.9, 358/2.1, 3.28, 406, 504, 3.26
See application file for complete search history.

(56) References Cited

U.S. PATENT DOCUMENTS

| | | | |
|---|---|---|---|
| 5,075,787 A * | 12/1991 | Shaughnessy et al. | 358/452 |
| 5,138,465 A * | 8/1992 | Ng et al. | 358/453 |
| 5,220,629 A | 6/1993 | Kosaka et al. | 381/52 |
| 5,577,164 A | 11/1996 | Kaneko et al. | 395/2.84 |
| 6,903,838 B1 * | 6/2005 | Hanson et al. | 358/1.15 |

FOREIGN PATENT DOCUMENTS

| | | |
|---|---|---|
| JP | 3-149600 | 6/1991 |
| JP | 7-219591 | 8/1995 |
| JP | 8-102808 | 4/1996 |
| JP | 8-102844 | 4/1996 |
| JP | 9-258943 | 10/1997 |
| JP | 9261382 | 10/1997 |
| JP | 10276256 | 10/1998 |
| JP | 200029585 | 1/2000 |
| JP | 200092259 | 3/2000 |
| JP | 2001358866 | 12/2001 |

OTHER PUBLICATIONS

Japanese Office Action dated Jul. 6, 2007.

* cited by examiner

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

Disclosed is a method that makes it easier to configure an image processing apparatus capable of reading an image and processing the image in accordance with settings information, the method including an identification step of identifying whether the read image is a document that carries settings information; and a setting step of setting the settings information, which is carried on the read image, if the read image has been identified as being a document carrying the settings information.

11 Claims, 15 Drawing Sheets

302 — SETTINGS FORM
303 — IS THIS SHEET A SETTINGS FORM ? ☐
304 — REFERENCE SETTINGS FORM   SHEET NO. [    ]
305 — NUMBER OF COPIES   [    ] COPIES
306 — MAGNIFICATION   [    ] %
307 — PAPER   [    ]
— SORTER   SORT ☐   GROUP ☐   SORT AND STAPLE ☐   CANCEL SETTINGS ☐
308 — DOUBLE-SIDED   SINGLE-SIDED > DOUBLE-SIDED ☐   DOUBLE-SIDED > DOUBLE-SIDED ☐   DOUBLE-SIDED > SINGLE-SIDED ☐   CANCEL SETTINGS ☐

SETTINGS FORM

402 — IS THIS SHEET ■
A SETTINGS FORM?

403 — REFERENCE SETTINGS FORM    SHEET NO. [       |       ]

404 — NUMBER OF COPIES                      [     5     ] COPIES

405 — MAGNIFICATION                         [ 1  0  0 ] %

406 — PAPER                                 [ A 4 ]

407 — SORTER       SORT ☐   GROUP ☐   SORT AND ☐   CANCEL ☐
                                          STAPLE      SETTINGS

408 — DOUBLE-SIDED   SINGLE-SIDED > ☐   DOUBLE-SIDED > ☐   DOUBLE-SIDED > ☐   CANCEL ☐
                    DOUBLE-SIDED       DOUBLE-SIDED       SINGLE-SIDED       SETTINGS

SETTINGS FORM

502 — IS THIS SHEET A SETTINGS FORM? ☐

503 — REFERENCE SETTINGS FORM   SHEET NO. [ ]

504 — NUMBER OF COPIES   [1] [5] COPIES

505 — MAGNIFICATION   [0] [0] %

506 — PAPER   [A] [4]

507 — SORTER   SORT ☐   GROUP ☐   SORT AND STAPLE ☐   CANCEL SETTINGS ☐

508 — DOUBLE-SIDED   SINGLE-SIDED > DOUBLE-SIDED ☐   DOUBLE-SIDED > DOUBLE-SIDED ☐   DOUBLE-SIDED > SINGLE-SIDED ☐   CANCEL SETTINGS ☐

FIG. 6

```
SETTINGS FORM                                                601

IS THIS SHEET          ■
A SETTINGS FORM?

REFERENCE SETTINGS FORM   SHEET NO. [    1    ]

NUMBER OF COPIES          [   1   |   0   ] COPIES

MAGNIFICATION             [           ] %

PAPER                     [           ]

SORTER      SORT □              GROUP □

DOUBLE-SIDED  SINGLE-SIDED >  ■  DOUBLE-SIDED >  □  SORT AND  □  CANCEL
              DOUBLE-SIDED       DOUBLE-SIDED       STAPLE       SETTINGS

SINGLE-SIDED >  □  DOUBLE-SIDED >  □              CANCEL
              DOUBLE-SIDED       SINGLE-SIDED                   SETTINGS
```

602 — IS THIS SHEET A SETTINGS FORM?
603 — REFERENCE SETTINGS FORM
604 — NUMBER OF COPIES
605 — MAGNIFICATION
606 — PAPER
607 — SORTER
608 — DOUBLE-SIDED

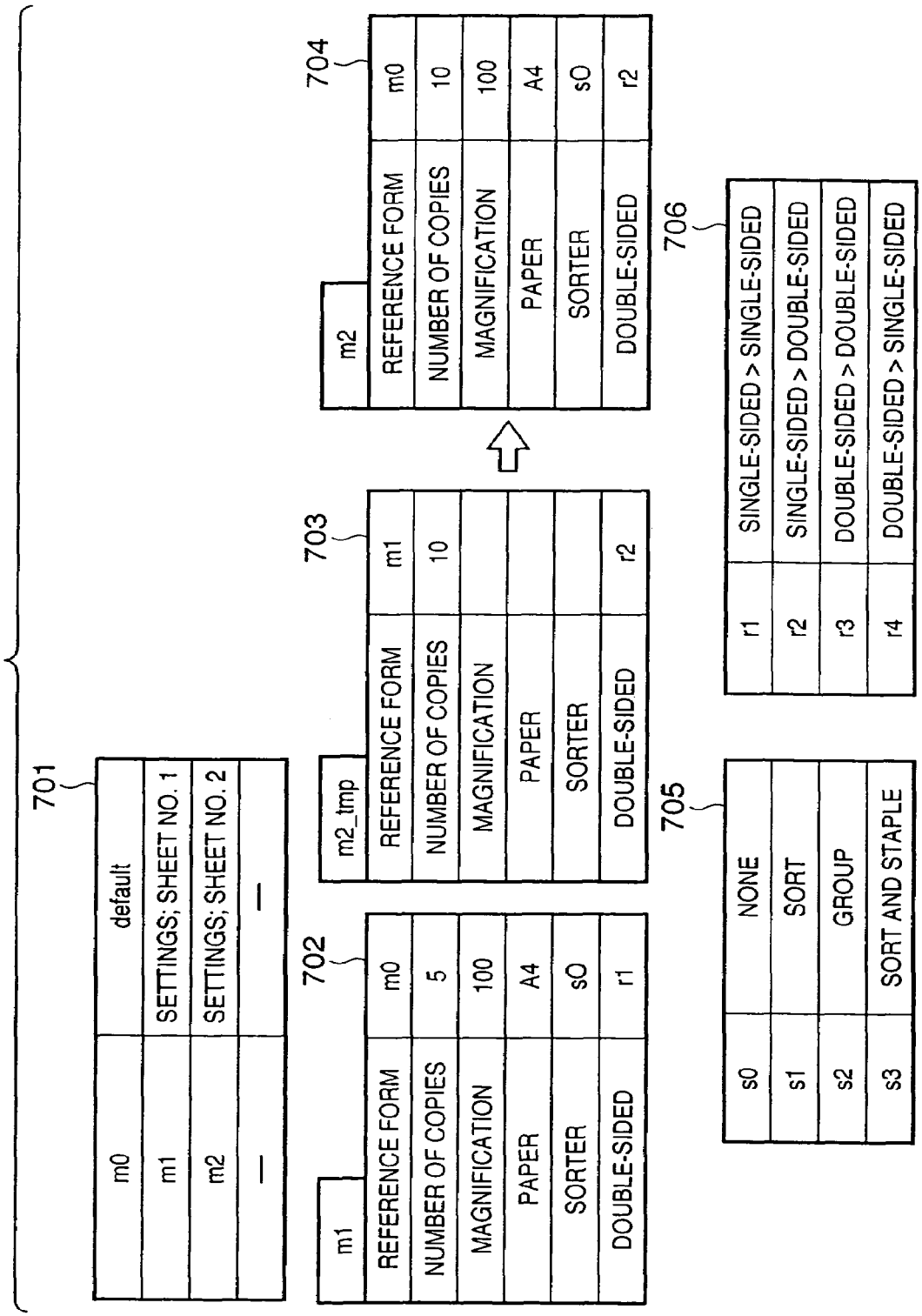

FIG. 12

RESULT OF SETTINGS

THE DOCUMENTS ABOVE HAVE BEEN COPIED ACCORDING TO
THE FOLLOWINGS SETTINGS:

| | |
|---|---|
| NUMBER OF COPIES : | 5 |
| MAGNIFICATION : | 100% |
| PAPER : | A4 |
| SORTER : | SORT |
| DOUBLE-SIDED : | SINGLE-SIDED > SINGLE-SIDED |

29 / May / 2002  11:30a.m.

SETTINGS FORM

IS THIS SHEET
A SETTINGS FORM? ■

REFERENCE SETTINGS FORM   SHEET NO.

NUMBER OF COPIES           COPIES

MAGNIFICATION              %

PAPER

SORTER        SORT □         GROUP □                   SORT AND     CANCEL
                                                        STAPLE □    SETTINGS □

DOUBLE-SIDED  SINGLE-SIDED > □   DOUBLE-SIDED > □      DOUBLE-SIDED > □   CANCEL
              DOUBLE-SIDED       DOUBLE-SIDED          SINGLE-SIDED       SETTINGS □

ADDITIONAL    UPPER □    LOWER □    UPPER ■    LOWER □    BACKGROUND □
INFORMATION   LEFT       LEFT       RIGHT      RIGHT

SELECT FROM FILE □    OPTIONAL ■
                      FILE BUS :                    MR./MS. ○○

1402

IMAGE PROCESSING APPARATUS, METHOD AND PROGRAM

FIELD OF THE INVENTION

This invention relates to an image processing apparatus and, more particularly, to a technique for improving usability when the apparatus is configured.

BACKGROUND OF THE INVENTION

In the field of image processing apparatus, there has heretofore been developed a multifunction apparatus in which various functions have been integrated, examples of which are a copier function, a facsimile transceive function and a printer function. Though such an apparatus is convenient, configuring the apparatus is more complicated and users tend to find such an apparatus troublesome and difficult to configure.

Methods of avoiding this complexity involved in configuring the apparatus for the purpose of simplifying the settings have been proposed. For example, the specification of Japanese Patent Application Laid-Open No. 8-102808 discloses a technique for reading a document image for setting purposes and configuring the apparatus based upon information from the image. Further, the specification of Japanese Patent Application Laid-Open No. 9-258943 discloses a technique for configuring an apparatus by specifying the apparatus settings based upon handwriting, characters, voice and bar codes.

However, none of these examples of the prior art are such that the apparatus is capable of recognizing a settings form automatically. Rather, the user must consciously follow an apparatus configuring process such as by pressing a settings button to instruct the apparatus that a certain form is indicative of the apparatus settings.

SUMMARY OF THE INVENTION

Accordingly, an object of the present invention is to make it more convenient to configure an image processing apparatus.

According to the present invention, the foregoing object is attained by providing an image processing method in an image processing apparatus that is capable of reading an image and processing the image in accordance with settings information, comprising an identification step of identifying whether the read image is an image carrying settings information; and a setting step of setting the settings information, which is carried on the read image, if the read image has been identified as being an image carrying the settings information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram illustrating an example of settings form used in an image processing apparatus according to a first embodiment of the present invention;

FIG. 4 is a diagram illustrating an example of entries on a settings form used in the image processing apparatus according to the first embodiment of the present invention;

FIG. 5 is a diagram illustrating an example of entries on a settings form used in the image processing apparatus according to the first embodiment of the present invention;

FIG. 6 is a diagram illustrating an example of entries on a settings form used in the image processing apparatus according to the first embodiment of the present invention;

FIG. 7 is a diagram illustrating data tables in the image processing apparatus according to the first embodiment of the present invention;

FIG. 12 is a diagram illustrating the results of settings made in an image processing apparatus according to a fourth embodiment of the present invention;

FIG. 14 is a diagram illustrating an example of entries on a settings form used in the image processing apparatus according to a sixth embodiment of the present invention.

DETAILED DESCRIPTION OF THE PREFERRED EMBODIMENTS

Preferred embodiments of the present invention will now be described in detail in accordance with the accompanying drawings.

First Embodiment

Figure 1:
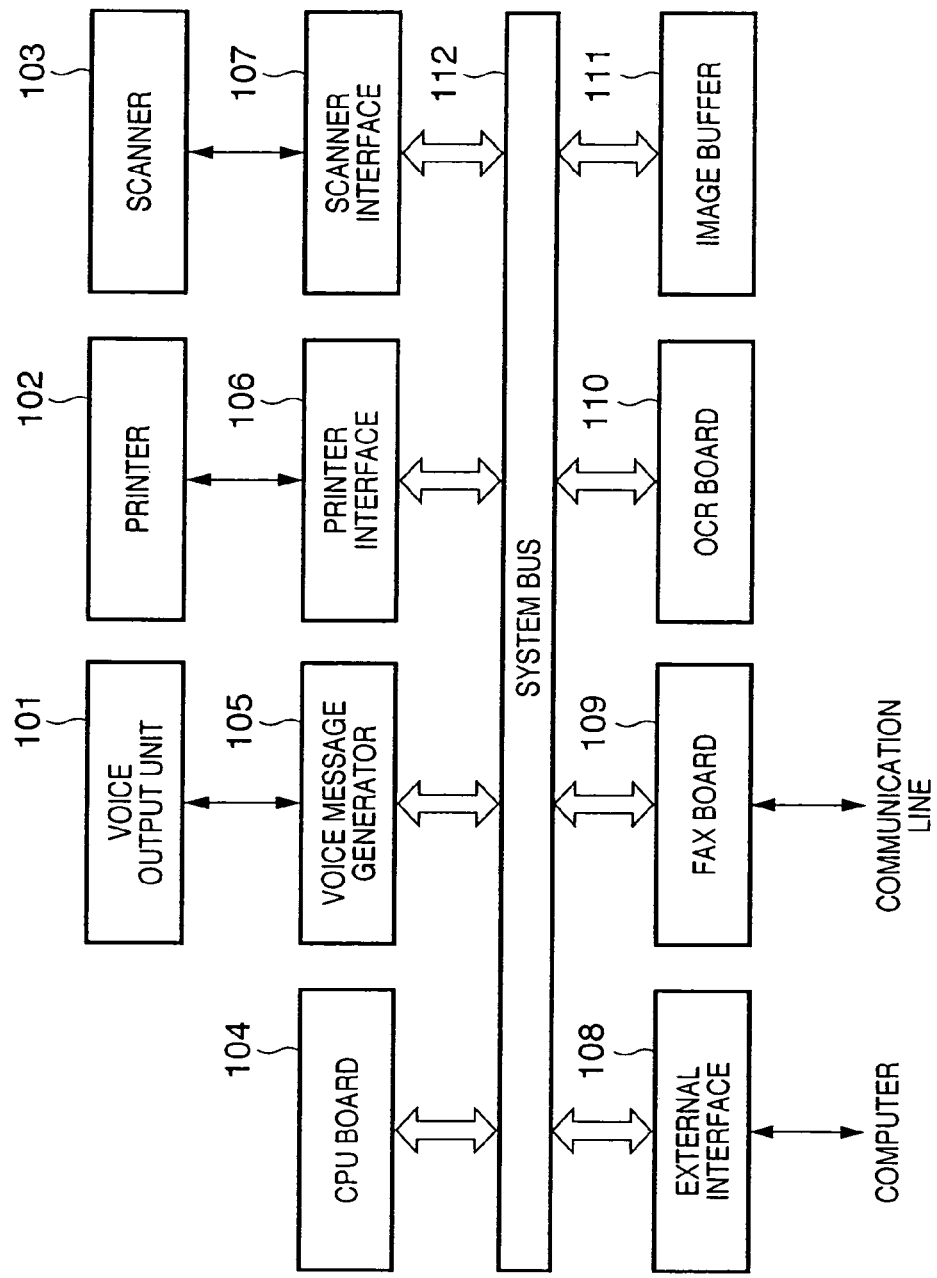
FIG. 1 is a block diagram illustrating the structure of an image processing apparatus that is in accordance with each of the embodiments of the present invention.

FIG. 1 is a block diagram illustrating the structure of an image processing apparatus according to the present invention. The apparatus includes a voice output unit 101 such as a speaker for outputting a message produced by a voice message generator 105. The generation of the voice message in the voice message generator 105 employs a well-known technique such as a speech synthesis method of the kind disclosed in the specification of Japanese Patent Application Laid-Open No. 3-149600. The apparatus further includes a printer 102, such as a laser printer or ink-jet printer, which is connected via a printer interface 106.

The printer interface 106 controls the printer 102 and performs control for interfacing data with an external device. A scanner 103 is connected via a scanner interface 107. Image data that has been read in from the scanner 103 is stored in an image buffer 111.

The apparatus further includes a CPU board 104 having a function for controlling the overall system; an external interface 108 for effecting a connection to an external device such as a computer; and a FAX (facsimile) board 109, which is connected to a communication line, capable of transmitting image data, which has been read in from the scanner 103, externally of the apparatus via the communication line, and of outputting image information, which has been sent from outside, by the printer 102.

An OCR board 110 reads a text document optically and recognizes characters that have been written on the document. The OCR board 110 reads in a marking sheet or the like and is capable of executing information processing.

Figure 2:
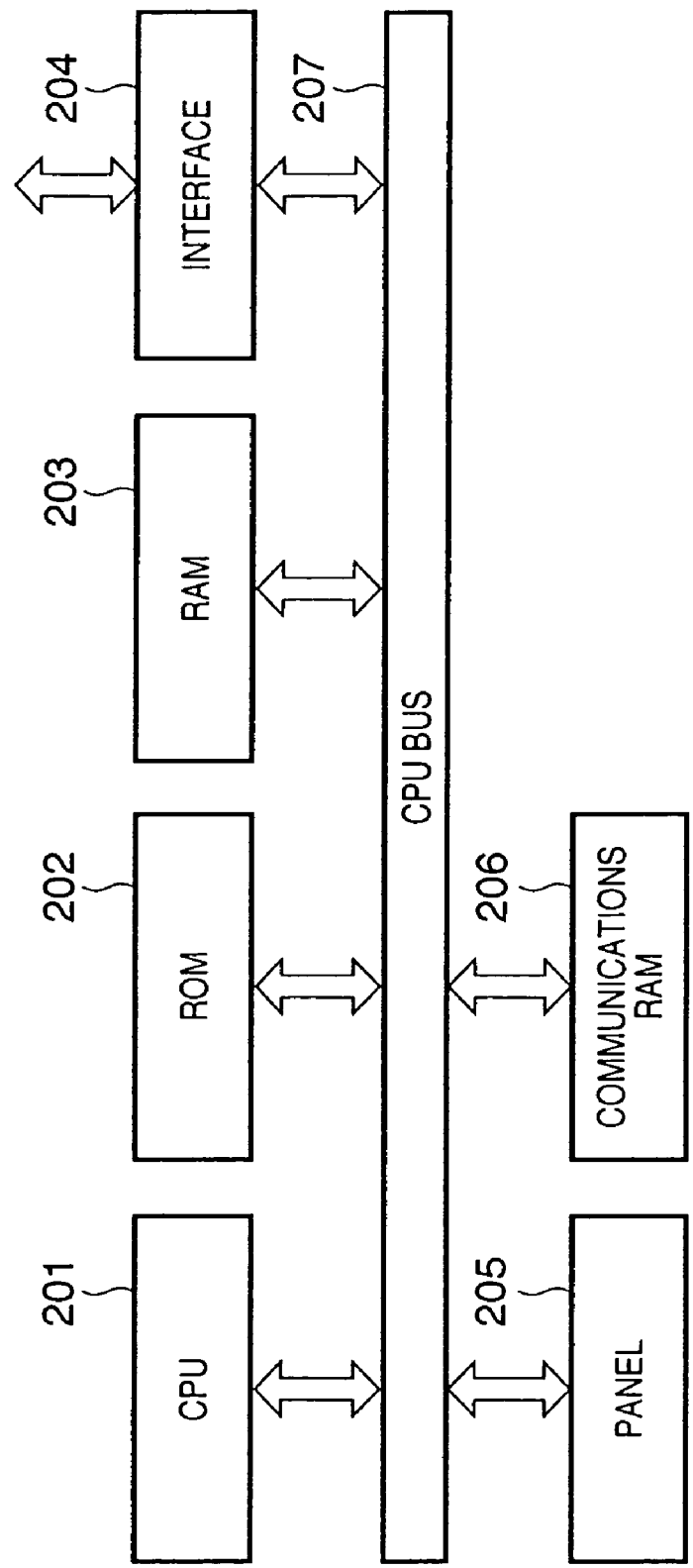
FIG. 2 is a block diagram illustrating a CPU board of the image processing apparatus that is in accordance with each of the embodiments of the present invention.
Figure 8:
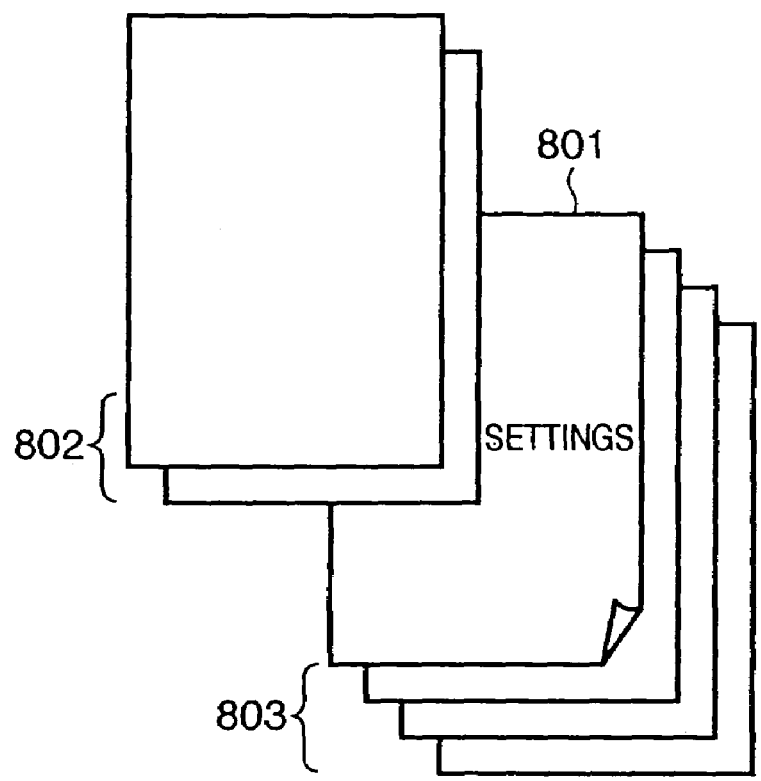
FIG. 8 is a diagram illustrating an example of how papers of settings forms are put in the original papers according to the first embodiment of the present invention.

FIG. 2 is a diagram illustrating the structure of the CPU board 104 each of the components of which is connected by a CPU bus 207. As shown in FIG. 2, the CPU board 104 includes a CPU 201 for controlling the overall system; a ROM 202 storing the control program of the CPU board 104 and various data; a RAM 203 for temporarily storing various data and the like necessary to run the control program; and an interface 204 for connecting the CPU board 104 and a system bus 112.

The CPU board 104 further includes a panel 205 for displaying messages intended for the user, and a communications RAM 206 through which each port of the apparatus may exchange information. For example, when the CPU 201 transmits information to the printer 102, it writes request information to the communications RAM 206. Each port checks the communications RAM 206 of the CPU board 104 at regular time intervals and determines whether or not request information has been written to the RAM 206. If request information has been written to the RAM 206, processing in accordance with this information is executed. When processing is finished, information indicative of this fact is written to the communications RAM 206 to so notify the CPU 201.

FIGS. 3 to 9 are diagrams illustrating operation of the image processing apparatus according to the present invention.

FIG. 3 illustrates an example (301) of a settings form used in configuring a copier. The settings form 301 may be a marking sheet. The settings form 301 has a box 302 that the user may check to indicate whether this sheet (document) is a settings form. If the box has been checked, as indicated at 402 in FIG. 4, this indicates that settings form 401 in FIG. 4 is for making settings.

If the box has not been checked, as shown at 502 in FIG. 5, then settings form 501 itself can be copied. By thus providing a check box indicating whether the sheet is for making settings, not only the user but also the apparatus per se can discriminate whether the sheet is for making settings or not.

Figure 9:
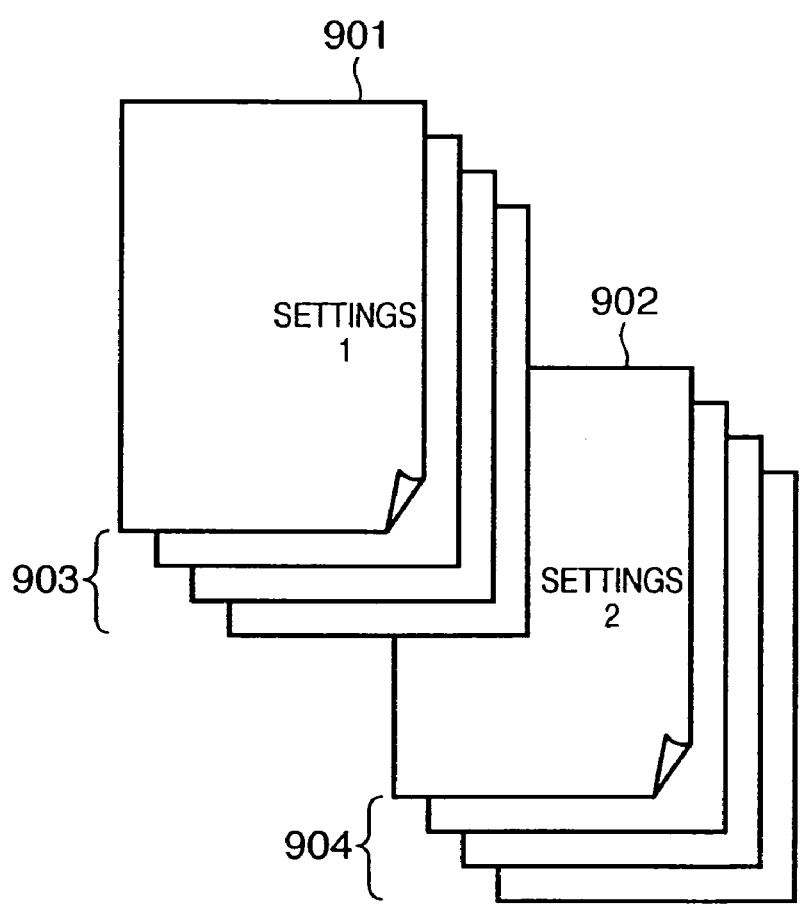
FIG. 9 is a diagram illustrating an example of how papers of settings forms are put in the original papers according to the first embodiment of the present invention.

A field 303 in FIG. 3 is for writing in the ordinal position of a form serving as a reference form. Here a form that serves as a reference is a sheet applied to a case where settings items are blank (not filled in). For example, in a case where settings forms used are plural in number, as shown in FIG. 9, the user employs a second settings form (902 in FIG. 9) to set the fact that the reference form is a first settings form (901 in FIG. 9). On the second settings form, therefore, the user need merely fill in only changes desired to be made to the settings.

The settings on the first settings form (901 in FIG. 9; 401 in FIG. 4) are stored beforehand in a data table 702 shown in FIG. 7, and the settings on the second settings form (902 in FIG. 9; 601 in FIG. 6) are stored temporarily in a data table 703 in FIG. 7. At this time the information contained in the reference settings (data table 702) is combined with that of data table 703, with the settings of table 702 that correspond to the blank items in table 703 being applied to these corresponding blank items. The combined results are stored in a data table 704.

Further, a list in which default values have been set for each of the items is stored beforehand. By specifying the list of these default values as the first form serving as the reference, the user need merely make entries in items where the default values are to be changed, thereby making it possible to make settings in simple fashion. Also shown in FIG. 3 is a field 304 for setting number of copies, a field 305 for setting magnification, a field 306 for setting paper size, an area 307 relating to a sorter, and an entry area 308 for filling in settings relating to double-sided printing.

FIG. 7 illustrates data tables (701 to 706). These data tables are created for each type of settings form (401 in FIG. 4) and for each type of settings item (402 to 408 in FIG. 4), and the data is stored. Table 701 stores a list of settings forms, and tables 702, 704 store data concerning each of the setting items of the settings forms. Table 703 is for temporarily storing data concerning each of the setting items of a settings form, table 705 is for previously storing settings values relating to sorting, and table 706 is for previously storing settings values relating to double-sided printing. Based upon the results of recognition by the OCR 110, these results are stored in each of the tables.

Figure 10:
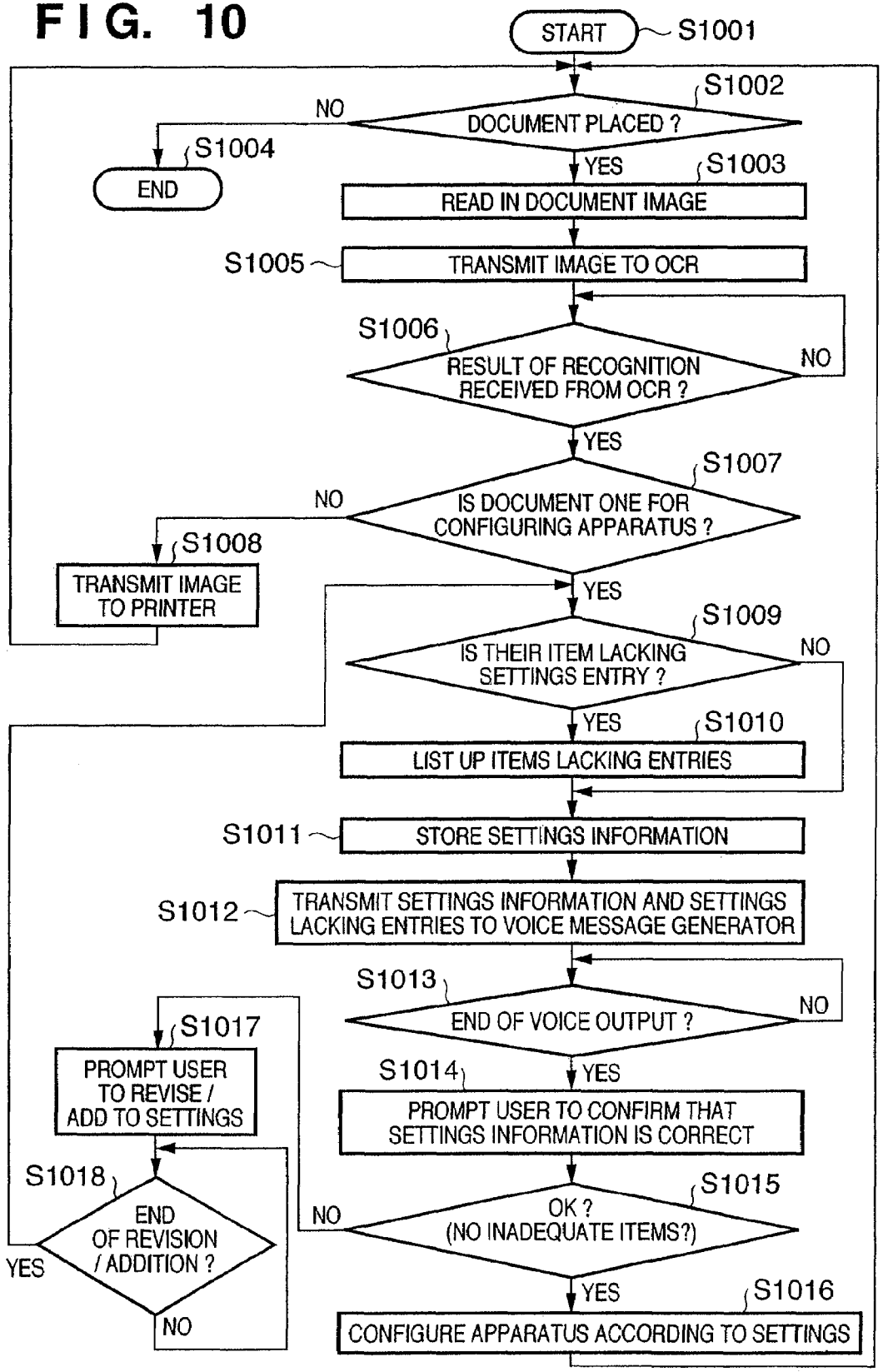
FIG. 10 is a flowchart illustrating the operation of the image processing apparatus according to the first embodiment of the present invention.

Processing by the image processing apparatus according to the first embodiment of the present invention will now be described. FIG. 10 is a flowchart, in which a copier is taken as an example, for reading in a document image and, if the document is a settings form, for configuring the apparatus based upon the form.

If a start button is pressed to start processing (step S1001) and it is determined that a document has been placed on the platen ("YES" at step S1002), the document image is read in by the scanner 103 (step S1003) and the read image is transmitted to the OCR 110 (step S1005). If no document has been placed on the platen ("NO" at step S1002), then processing is exited (step S1004). If a result of recognition is received from the OCR 110 ("YES" at step S1006), it is determined from this result whether the document is one for configuring the apparatus (step S1007).

The determination as to whether the document is for configuring the apparatus is made by determining whether the document has a prescribed format, which can be discriminated from the characters, symbols and positions and sizes of borders in the results recognized by the OCR 110. The prescribed format is required to be stored beforehand and may be registered by user. If the document has the prescribed format, box 302 in FIG. 3 is investigated to determine whether it has been checked. If box 302 in FIG. 3 has been checked, then the document is recognized as being for the purpose of configuring the apparatus.

If the document is not a document for configuring the apparatus ("NO" at step S1007), the image read from the document is transmitted to the printer (step S1008). If the document is a document for configuring the apparatus, on the other hand, then control proceeds to step S1009. If the settings items lack entries in terms of operating the apparatus ("YES" at step S1009), these items are listed up (step S1010). If there are no items having such difficient entries, control proceeds to step S1011. Here the settings information is stored. The settings information, as well as information relating to any items having deficient entries, is transmitted to the voice message generator 105 (step S1012).

As mentioned above, generation of the voice message employs a well-known technique such as the speech synthesis method disclosed in the specification of Japanese Patent Application Laid-Open No. 3-149600. When the voice output ends ("YES" at step S1013), the user is prompted to confirm that the apparatus has been configured correctly (step S1014). If the settings are confirmed to be correct ("YES" at step S1015), then the apparatus is configured in accordance with these settings (step S1016).

If a setting is erroneous or a settings item is deficient, the user is prompted to revise or add to (correct) the setting (step S1017). After the revision and/or addition ("YES" at step S1018), control returns to S1009. It should be noted that confirmation relating to the voice message may be performed by displaying characters or symbols on the panel (205 in FIG. 2).

As should be evident from the description rendered above, this embodiment is such that by providing a prescribed format with an area in which the user enters whether a document is a settings form, the apparatus is capable of distinguishing between a settings form and a document for copying. This means that the apparatus can be configured in simple fashion by having the user place a sheet of paper on which the settings have been filled in on the apparatus platen together with the documents that are for copying.

Further, filling in the settings on the settings form makes it unnecessary for the user to perform troublesome settings on the spot (e.g., while standing in front of the copier) and enables the settings to be filled in beforehand. Another individual can be made to make the entries on the settings form, and it is also possible to copy the settings form itself. This enhances convenience when difficult settings need to be made. A settings form can be included among other documents, as indicated at 801 in FIG. 8. Here the currently prevailing settings are used with regard to documents 802 preceding the settings form 801, and the content that has been filled in on the settings form 801 becomes valid with regard to documents 803 following the settings form 801.

Second Embodiment

Figure 11:
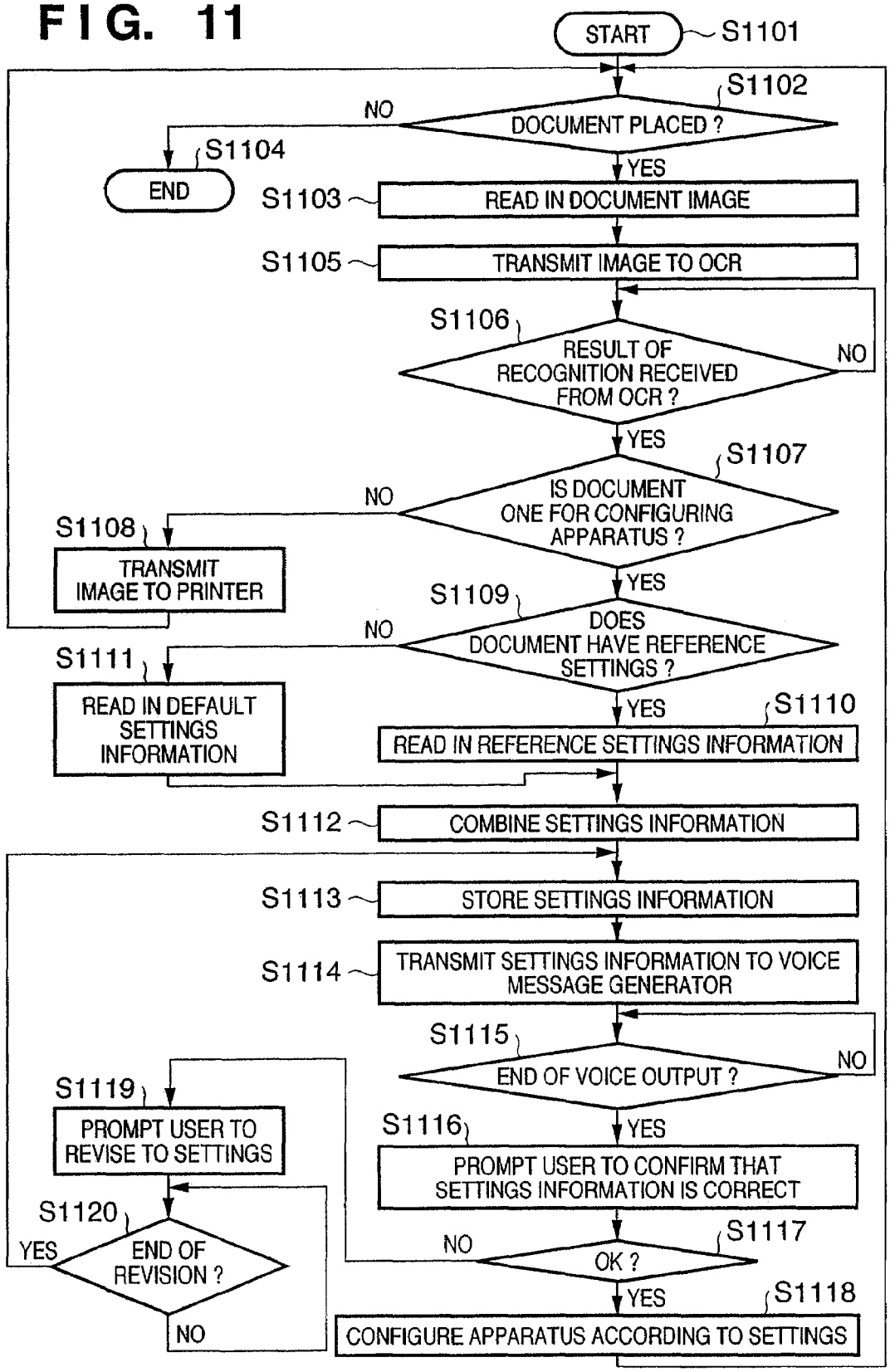
FIG. 11 is a flowchart illustrating the operation of an image processing apparatus according to a second embodiment of the present invention.

An image processing apparatus according to a second embodiment of the present invention. In the first embodiment, it is assumed that a single settings form is included in documents set in the apparatus at one time. However, it is also possible to include a plurality of settings forms (901, 902), as shown in FIG. 9. A flowchart for executing this operation is illustrated in FIG. 11 taking a copier as an example.

If a start button is pressed to start processing (step S1101) and it is determined that a document has been placed on the platen ("YES" at step S1102), the document image is read in by the scanner 103 (step S1103) and the read image is transmitted to the OCR 110 (step S1105).

If no document has been placed on the platen ("NO" at step S1102), then processing is exited (step S1104). If a result of recognition is received from the OCR 110 ("YES" at step S1106), it is determined from this result whether the document is one for configuring the apparatus (step S1107). The determination as to whether the document is for configuring the apparatus is made by determining whether the document has a prescribed format, which can be discriminated from the characters, symbols and positions and sizes of borders in the results recognized by the OCR 110.

The prescribed format is required to be stored beforehand and may be registered by user. If the document has the prescribed format, box 302 in FIG. 3 is investigated to determine whether it has been checked. If box 302 in FIG. 3 has been checked, then the document is recognized as being for the purpose of configuring the apparatus.

If the document is not a document for configuring the apparatus ("NO" at step S1107), the image read from the document is transmitted to the printer (step S1108). If the document is a document for configuring the apparatus, on the other hand, then control proceeds to step S1109. If the document has reference settings, ("YES" at step S1109), this settings information is read in (step S1110). If the document does not have reference settings, ("NO" at step S1109), then default settings information is read in (step S1111). With regard to the default settings information, it is possible for the user to set the values in advance.

Next, the settings that have been read from the document image for settings and the reference settings information or default setting information are combined (step S1112) and the results are stored in a data table (FIG. 7) (step S1113).

As for the method of combining the above information, a conceivable method is to set an area that was blank in the settings document to a value in the reference settings information. However, the invention is not limited to this method. Next, at step S1114, the information that has been set is transmitted to the voice message generator 105.

As mentioned above, generation of the voice message employs a well-known technique such as the speech synthesis method disclosed in the specification of Japanese Patent Application Laid-Open No. 3-149600. When the voice output ends ("YES" at step S1115), the user is prompted to confirm that the apparatus has been configured correctly (step S1116). If the settings are confirmed to be correct ("YES" at step S1117), then the apparatus is configured in accordance with these settings (step S1118).

If a setting is erroneous, the user is prompted to revise the setting (step S1119). After the revision ("YES" at step S1120), control returns to S1113. It should be noted that confirmation relating to the voice message may be performed by displaying characters or symbols on the panel (205 in FIG. 2).

In a case where a plurality of settings forms are included among the documents, as shown in FIG. 9, settings that have been filled in on the settings form 901 become the settings of documents 903 that follow the settings form 901, and settings that have been filled in on the settings form 902 become the settings of documents 904 that follow the settings form 902. For example, if "SINGLE SIDED>SINGLE-SIDED COPY" is set by the settings form 901 and "SINGLE SIDED>DOUBLE-SIDED COPY" is set by the settings form 902, "SINGLE SIDED>SINGLE-SIDED COPY" will be applied to the documents 903 and "SINGLE SIDED>DOUBLE-SIDED COPY" will be applied to the documents 904.

By adopting means such as calling out the settings by voice or displaying the settings on the panel (205 in FIG. 2) also when settings change partway through a number of documents, as described above, a user-friendly interface can be achieved.

Third Embodiment

The first and second embodiments have been illustrated taking a copier as an example. However, it is possible to perform operation in a similar manner also with regard to the configuring of an apparatus when a document is transmitted by facsimile or e-mail. In such case the destination of the facsimile transmission or the address of the e-mail transmission would be set not by pressing a button provided on the apparatus but by filling in the destination or address on a settings form in advance, thereby making it possible to configure the apparatus simply.

Fourth Embodiment

Settings information that has been set in the apparatus in the first and second embodiments can also be read out of the data table (FIG. 7) and printed by the printer 102.

By way of example, a settings-result sheet 1201 is printed, as shown in FIG. 12, following the copied documents. At this time the information on the sheet may be printed together with the time at which the copying operation was performed. Further, a specific settings form may be output in such a manner that these settings can be re-utilized. If this expedient is adopted, it is possible to ascertain when a document was copied and in accordance with what settings.

Further, in a case where copying has been requested by another person, the person who requested copying can ascertain and check the settings. The settings can not only be printed but can also be transmitted by e-mail or facsimile or reported to a computer over a network.

Fifth Embodiment

With regard to means for revising and/or adding to settings in the first and second embodiments, it is also possible to use voice recognition techniques in addition to means that relies upon a GUI screen displayed on the panel (205 in FIG. 2) or operation of a button.

Figure 13:
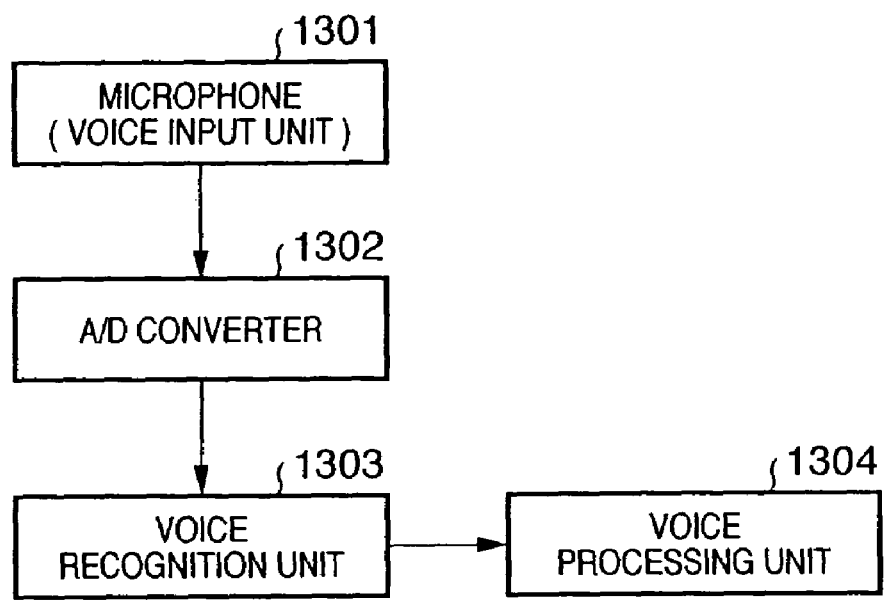
FIG. 13 is a block diagram illustrating the structure of an image processing apparatus according to a fifth embodiment of the present invention.

For example, as shown in FIG. 13, the apparatus is provided with a voice input unit 1301 such as a microphone, a well-known A/D converter 1302 for converting an analog signal of the entered voice to a digital signal; a voice recognition unit 1303 for recognizing the entered voice; and a voice processing unit 1304 for analyzing voice.

With regard to the voice recognition unit 1303 and voice processing unit 1304, well-known means such as a voice processing apparatus disclosed in the specification of Japanese Patent Application Laid-Open No. 7-219591 is used. Since this makes it possible to make revisions by voiced dialog, even a user who is visually impaired can correct settings easily.

Sixth Embodiment

In the first and second embodiments, a settings form is filled out with the apparatus settings. However, it is also possible to fill in additional information.

For example, as shown in FIG. 14, optional text such as a name, destination or date and optional images are entered on a settings form 1401 as additional information 1402, and the characters, symbols or images are printed out together when copying is performed by the copier. The additional information may be read by the scanner 103 and stored in the same manner as the settings information.

Figure 15:
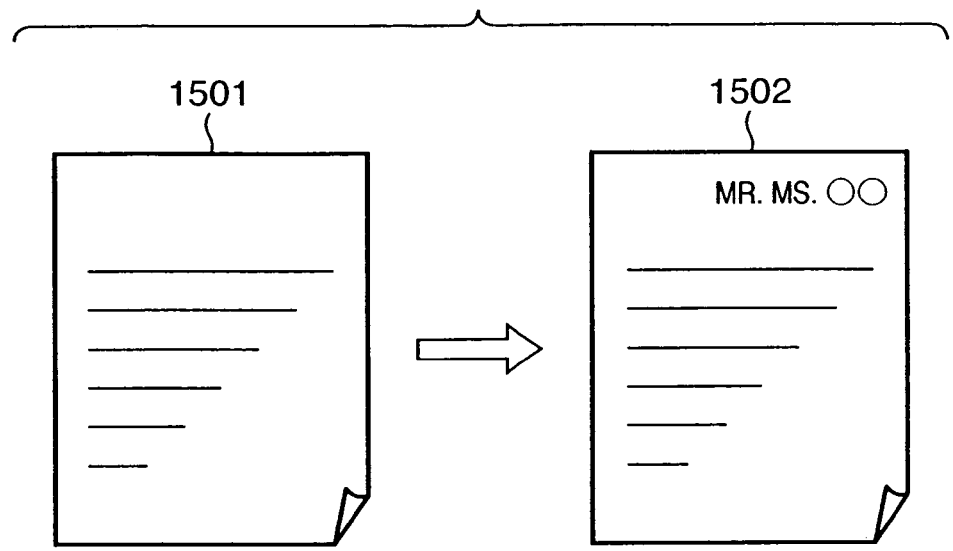
FIG. 15 is a diagram illustrating the results of settings made in an image processing apparatus according to the sixth embodiment of the present invention.

When a document (1501 in FIG. 15) is output by the printer 102, the above information is read in, combined and printed (1502 in FIG. 15). With regard to such combining and printing of information, use may be made of a well-known technique such as a method disclosed in the specification of Japanese Patent Application Laid-Open No. 08-102844, in which desired merge information is output while being merged with an area that is specified.

Seventh Embodiment

In the first and second embodiments, the determination as to whether a document is one for configuring the apparatus is made by discriminating whether the document has a prescribed format, which is judged based upon the characters, symbols and positions and sizes of borders recognized by the OCR 110. However, the determination may be achieved by using an electronic watermark or two-dimensional bar code.

In a case where an electronic watermark is used, the user fills in settings on a sheet in which information to the effect that the purpose of the sheet is configuring of the apparatus is embedded as watermark data. In the case of a copier, paper in which watermark data has been embedded is stacked on a certain tray beforehand and, if a settings form per se is to be copied, printing is performed using this sheet of paper. Operation is similar in a case where a two-dimensional bar code is employed.

OTHER EMBODIMENTS

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the functions of the above embodiments.

Thus, in accordance with the present invention, it is easier to configure an image processing apparatus.

The present invention is not limited to the above embodiments and various changes and modifications can be made within the spirit and scope of the present invention. Therefore, to apprise the public of the scope of the present invention, the following claims are made.

What is claimed is:

1. An image processing method in an image processing apparatus, comprising:
   a reading step of reading a document image;
   an identification step of identifying, based upon document format, whether or not the read document image contains settings information;

a processing step, if the read document image has not been identified as a document image containing settings information, that transmits the document image to a printing unit and print-processes the document image in accordance with settings previously stored in a data table; and a setting step, if the read document image has been identified as being a document image containing settings information, that writes the settings information into the data table, so that a document image later read is print-processed in accordance with the settings, wherein the settings information which is carried on the read document image may include a subset of the settings included in the data table, and wherein, if a read document image includes a subset of the settings in the data table and references a previously read document image containing settings information, settings from the referenced document image are first written into the data table, then any settings contained on the later read document image are written into the data table, replacing corresponding settings from the referenced document image, and wherein, if a read document image includes a subset of the settings in the data table and no previously read document image containing settings information is referenced by the later read document, default settings are written into the data table, then any settings contained on the later read document are written into the data table, replacing the corresponding default settings.

2. The method according to claim 1, wherein said identification step identifies whether the read document image is a document carrying settings information based upon information that has been added onto the read image at a prescribed position thereof.

3. The method according to claim 1, wherein said identification step identifies whether the read document image is a document carrying settings information based upon electronic watermark information that has been added onto the read document image.

4. The method according to claim 1, wherein said identification step identifies whether the read document image is a document carrying settings information based upon information of a two-dimensional bar code that has been added onto the read document image.

5. The method according to claim 1, further comprising a display step of displaying the settings information, wherein, if the settings information carried on the read document image has a deficiency, said display step displays the settings item to which the deficiency pertains.

6. The method according to claim 1, further comprising a voice output step of outputting the settings information, wherein, if the settings information carried on the read document image has a deficiency, said voice output step outputs as voice a settings item to which the deficiency pertains.

7. The method according to claim 1, further comprising a correction step of correcting the settings information, wherein said correction step corrects the settings information based upon a recognized voice input.

8. The method according to claim 1, further comprising an image synthesis step of combining the read document image, said image synthesis step performing image synthesis using a previously read document image for combination, when the previously read document image is referenced in the settings information of the newly read document image.

9. The method according to claim 1, further comprising a printout step of printing out settings information, which has been used to print-process the read document image, after the read document image has been print-processed.

10. A computer-readable storage medium storing a computer-executable control program for causing a computer to implement the image processing method set forth in claim 1.

11. An image processing apparatus, comprising:

reading means for reading a document image;

identification means for identifying, based upon document format, whether or not the read document image contains settings information;

processing means, if the read document image has not been identified as a document image containing settings information, for transmitting the document image to a printing unit and print-processing the document image in accordance with settings previously stored in a data table; and setting means, if the read document image has been identified as being a document image carrying settings information, for writing the settings information into the data table, so that a document image, read after the document image containing settings information, is print-processed in accordance with the settings information wherein the settings information which is carried on the read document image may include a subset of the settings in the data table, and wherein, if a read document image includes a subset of the settings in the data table and references a previously read document image containing settings information, settings from the referenced document image are first written into the data table, then any settings contained on the later read document image are written into the data table, replacing corresponding settings from the referenced document image, and wherein, if a read document image includes a subset of the settings in the data table and no previously read document image containing settings information is referenced by the later read document, default settings are written into the data table, then any settings contained on the later read document are written into the data table, replacing the corresponding default settings.

* * * * *